Sept. 20, 1960 R. FRIESS 2,953,179
MEAT COMMINUTING APPARATUS
Filed Oct. 10, 1957 2 Sheets-Sheet 2
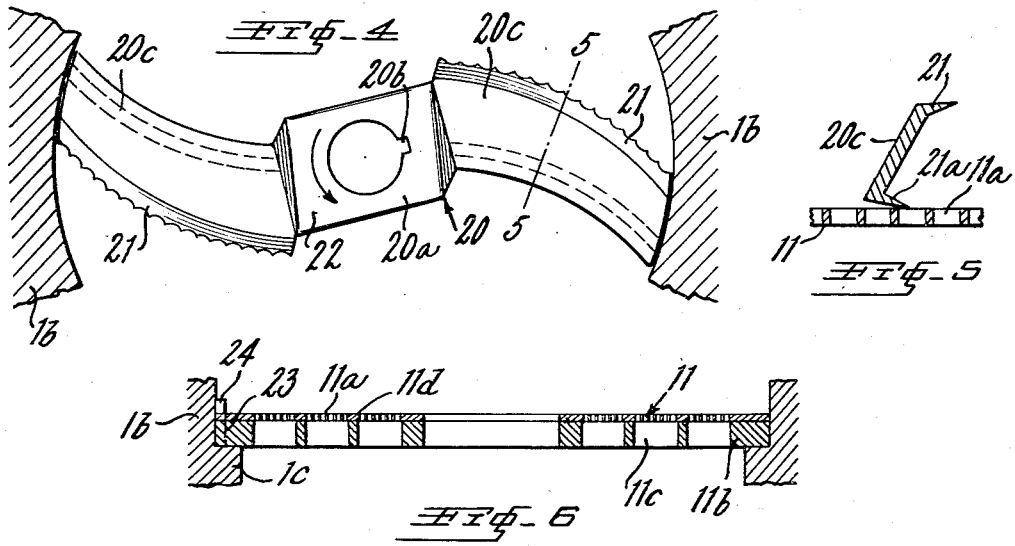
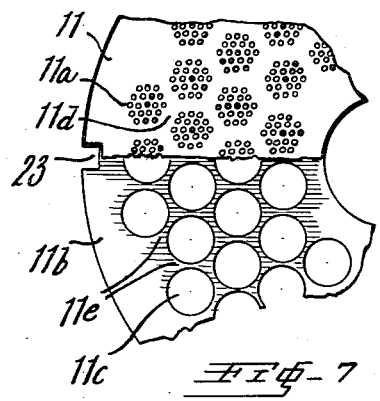
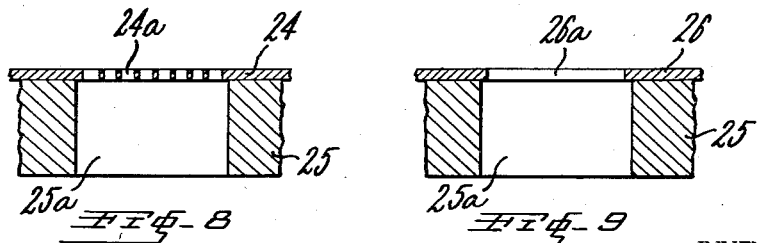
INVENTOR.
ROBERT FRIESS
BY

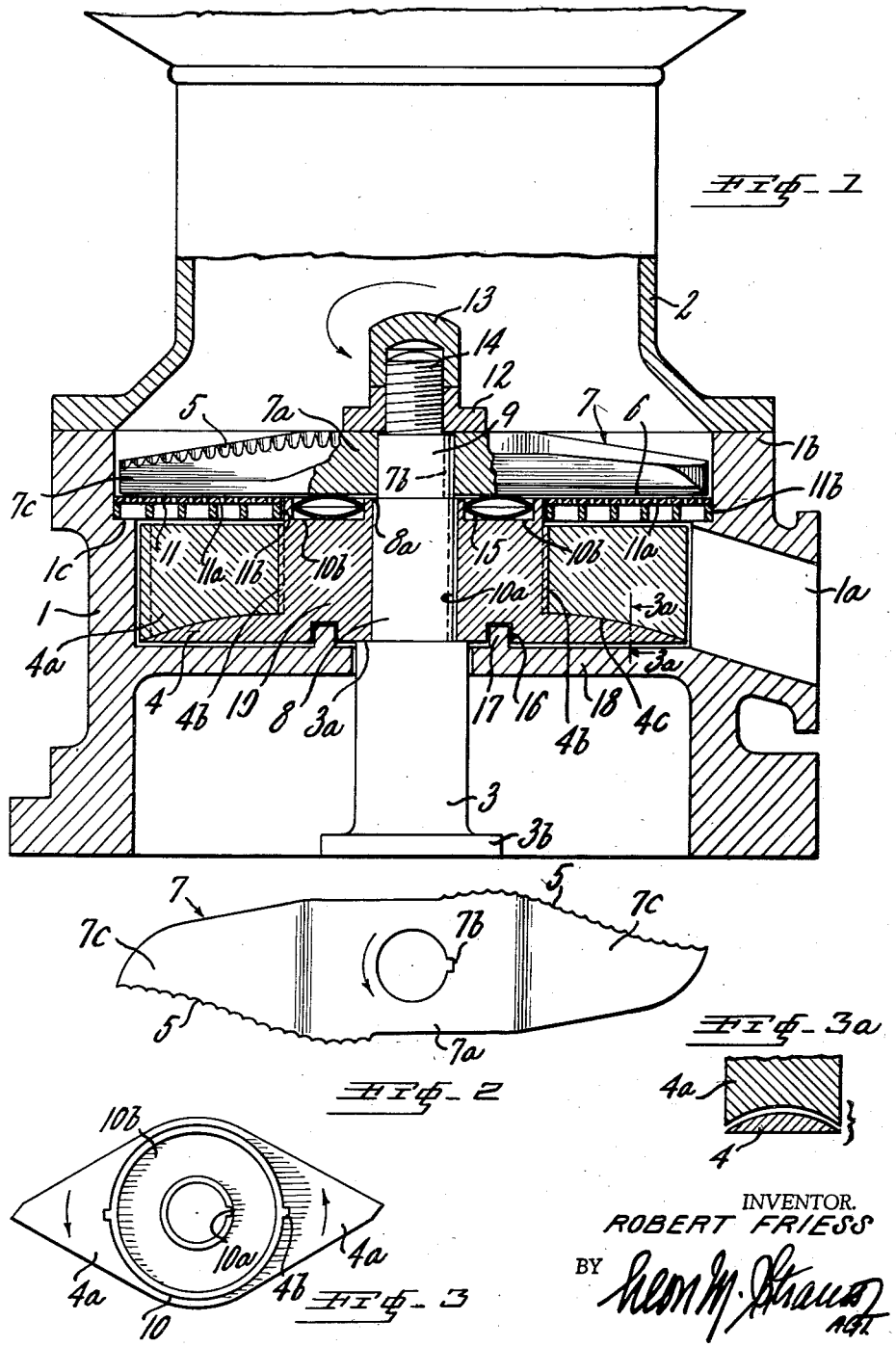

United States Patent Office 2,953,179
Patented Sept. 20, 1960

2,953,179

MEAT COMMINUTING APPARATUS

Robert Friess, Malmsheim Kreis Leonberg, Germany

Filed Oct. 10, 1957, Ser. No. 689,354

Claims priority, application Germany Feb. 20, 1957

8 Claims. (Cl. 146—192)

This invention relates to apparatus for comminuting meat, animal fodder and like materials, and especially to a cutter head for such apparatus.

More particularly, the invention contemplates provision of means facilitating great flexibility and adjustability in meat comminuting and like apparatus to thereby greatly protect the cutting knife or blade against undue wear and dullness and to chop up and prepare said meat or like alimentary product, so that it improves its sales appeal and is of desired fineness.

A further aim of the invention is to provide means conducive to the construction of a rotary multi-bladed cutting tool or knife having both coarse pre-cutting edges and fine cutting edges whereby the latter may rotate at a pre-controlled distance above a stationary perforated plate through which the ground material is forced and disposed onto a multi-armed scraper carried and rotatable by the same shaft which supports and rotates the aforesaid knife.

In order to render the range of uses of such an apparatus as wide as possible, it has already been proposed to equip the same with interchangeable perforated plates and, apart from this, to construct the apparatus in such a manner that the distance between the rotating knife and the perforated plate may be adjusted. By virtue of this adjustability, it is possible to compensate for wear of the knife caused by extensive use and to correct at any desired time the distance between the knife and the plate.

In a known apparatus of this type, the shaft on which the knife is mounted and which simultaneously serves as the output shaft of the drive motor is arranged for axial displacement in the housing of the apparatus and can be adjusted by means of a handwheel arranged beneath the motor.

This type of adjustment, however, suffers from the considerable disadvantage that the handwheel is located interiorly of the apparatus housing and thus is not easily accessible, while furthermore the scraper is always shifted whenever the spacing between the knife and the perforated plate is adjusted. This last-named condition entails the restrictive consequence that adjustment of the knife can be effected only within very narrow limits.

It is, therefore, an object of the present invention to provide means facilitating comminuting or grinding of meat and other materials of a similar nature in an efficient and highly efficacious manner.

Another object of the present invention is to provide a cutter head for meat grinders which is equipped with means affording easy and rapid adjustment of a rotatable cutting tool relative to a stationary perforated plate while enabling a scraper rotatable adjacent that surface of said plate remote from the cutting tool to remain at a constant spacing from the plate.

Still another object of the invention is the provision of means contributing to ready access to the interior of apparatus of the aforesaid type for the purpose of adjusting the cutting tool and removing and/or replacing the same as well as the plate and scraper for the purpose of inspection, repair, cleaning and similar operations.

More specifically, the present invention enables the hereinabove referred to disadvantages of known comminuting apparatus to be overcome by virtue of the fact that the knife is axially displaceably mounted on the knife-carrying shaft adjacent one end thereof for adjustment therealong by means of an adjusting nut threaded onto the shaft end and secured thereon by a lock nut. In order to render this adjustment as simple as possible, the present invention contemplates the provision of one or more springs supported by the scraper and bearing against the knife so as to bias the knife against the adjusting nut. In accordance with a preferred embodiment of the invention, the upper surface of the scraper supports a plurality of pairs of plate springs which contact the knife from below and thus bring the hub of the latter into engagement with the adjusting nut.

As intimated hereinabove, a construction according to the invention is greatly simplified and efficacious and renders possible easy replacement of the knife as well as of the perforated cutter plate, and has the further advantage that any pre-set spacing of the scraper assembly from the perforated cutter plate remains undisturbed during adjustment of the knife.

Yet a very important object of the invention resides in the provision of means purposing the performance of a single comminuting operation for the meat or like product and an easy and ready interchangeability of perforated cutting plates relative to the knife and also to a support plate having apertures which may be arranged in varying relationship with respect to the number of perforations of the plate the configuration of said perforations and grouping thereof in said cutting plate, the latter being coupled without any difficulty with said apertured support plate during said comminuting operation.

Still another object of the present invention is to provide means affording a novel construction of composite ejector plate means, whereby the apparatus may be employed for the manufacture of sausage, as well as for hamburger products.

The foregoing and other objects and advantages of the present invention will be more readily manifest from a consideration of the following detailed description when taken in conjunction with the accompanying drawings, in which:

Fig. 1 is a sectional elevational view of the upper part or cutter head of a comminuting apparatus constructed in accordance with the present invention;

Fig. 2 is a top plan view of the knife or cutting tool;

Fig. 3 is a top view of the scraper;

Fig. 3a is an enlarged section taken along lines 3a—3a of Fig. 1 showing in exploded stage upper and lower scraper portions.

Fig. 4 is a top plan view, partly in section of a modified knife employable in this invention;

Fig. 5 is an enlarged sectional view taken along lines 5—5 of Fig. 4;

Fig. 6 shows a cross-sectional view of a perforated plate and apertured support assembly employable in the invention;

Fig. 7 is a fragmentary top plan view of the perforated plate and apertured support therefor as seen in Fig. 6, the plate and support being partly broken away to indicate their relationship when placed in superposed position.

Fig. 8 is a fragmentary and enlarged detail view in section of the plate-support assembly seen in Fig. 6; and Fig. 9 shows a fragmentary sectional view of the perforated plate and support assembly in modified form.

Referring now more particularly to the drawings, it will be seen that the upper part of the comminuting apparatus is constructed for bodily removal from the drive part of the apparatus (not shown) which contains suitable drive means, usually an electric motor. The cutter head proper comprises a housing 1 provided with an outlet duct 1a and supporting on its upper rim 1b with the aid of any suitable fastening means (not shown) a feed or supply funnel or hopper 2 as well as a centrally located rotatable shaft 3. The shaft 3 is provided with two axial sections 8 and 9 of reduced diameter, which form annular shoulders 3a and 8a defining seats, respectively, for the hubs 7a and 10 of the scraper 4 and the knife 7, the knife and the scraper being retained against rotation relative to the shaft by means of keys engaging correspondingly shaped grooves 7b and 10a in the hubs 7a and 10 respectively.

Both the scraper 4 and knife 7 are provided with a plurality of arms, two such arms being shown in the drawing, and the knife 7 is provided on each of its arms or blades with a coarse pre-cutting edge 5, serrated to provide a greater cutting surface, and with a smooth, fine cutting edge 6. The blade surfaces are slanted, so that each coarse edge 5 is disposed in a higher plane than the associated fine edge 6.

Scraper 4 proper is of relatively reduced height, is curved and ascending toward its hub 10. At the outer surface of hub 10 there are provided keyways 4b for removably receiving upper scraper portion or portions 4a for secure connection with the base scraper 4 for a purpose later referred to.

Supported on a shoulder 1c of the housing 1 is an annular plate or disc 11 provided with a plurality of small sharp-edged perforations 11a, and it will be seen that the perforated plate 11 is disposed a predetermined distance above the upper scraper portion 4a and directly below the knife 7, sufficient clearance being left between the plate 11, and the blades or arms 7c of the knife to permit unimpeded rotation of the latter. The hub 10 of the scraper proper 4 is extended upwardly beyond the scraper parts 4, 4a and through the central aperture 11b of the perforated plate and is provided with a plurality of recesses 10b in each of which is seated a pair of curved plate springs 15, which may take the form of Belleville washers, bearing against the bottom surface of the knife hub 7a. The shaft 3 is provided with a further externally threaded extension 14 onto which are screwed an adjusting nut 12 and a lock nut 13, which are employed to determine the axial position of the knife 7 relative to the plate 11 as well as to ensure retention of the knife on the shaft 3. The knife is, of course, subjected to the resilient pressure exerted by the springs or Belleville washers 15 which bias it toward and against the nut 12.

The lower surface of the hub 10 of the scraper 4 is provided with an annular groove 16 into which extends an annular ledge 17 located concentrically about shaft 3 on a partition 18 arranged transversely across the housing 1 and defining the bottom of the chamber in which the scraper moves and into which the food or other material in relatively finely ground and comminuted state falls from the perforated plate 11. The groove 16 and ledge 17 thus define a labyrinth seal which prevents any of the comminuted material from falling below the partition 18 where it could soil and interfere with the operation of the motor (not shown) or other drive means.

In operation, the material to be comminuted is fed into hopper 2 so as to fall onto the knife 7 which is being rotated by the motor, the output shaft of which is conventionally connected to the lower end 3b of the knife-carrying shaft 3. The material is precut by the coarse, serrated cutting edges 5 and then, upon arriving at the plate 11, is pressed into and through the perforations 11a by the slanted blade surfaces and fine cutting edges 6, which are spaced from the upper surface of the perforated plate a distance predetermined by the setting of the nut 12, this setting being chosen in accordance with the toughness or other cutting characteristics of the material to be comminuated.

The blades of the scraper 4 ensure continuous removal of comminuted material from the plate 11, this material being moved radially outwardly in the scraper chamber due to centrifugal force effects and leaving the chamber when brought by one of the scraper blades to the outlet duct 1a from which it may be collected in any suitable receptacle.

As may be seen from the drawing, the knife 7, which is illustrated as having only two arms or blades, but which may equally well have three or more such arms, as well as the perforated plate 11 and the scraper 4 may be readily removed from the apparatus by removing the supply hopper 2 and then unwinding the lock nut 13 and adjusting nut 12 from the threaded end 14 of the shaft 3, whenever it is desired to replace one or more of these parts or to clean the apparatus. Moreover, as can be seen from Fig. 1, since the knife shaft 3 is conventionally releasably connected with the motor output shaft, the entire upper part of the apparatus may be lifted from the drive part thereof whenever necessary, to facilitate transportation, repair of the motor or any other operation dependent on access to the drive part of the apparatus.

Referring now more particularly to Figs. 4 to 6 there is disclosed a curved knife 20 having a hub 20a and a hub groove 20b. Knife blades 20c are curved in opposed relation, as shown and are provided with respective serrated upper cutting edges 21 for rotation normally in the direction of arrow 22. The lower cutting edges 21a are substantially inclined (Fig. 5) and are disposed a predetermined, but regulatable distance from perforated cutting plate 11. Plate 11 is provided with perforations 11a of predetermined diameter which are grouped, for instance, as indicated in Fig. 7. Plate 11 is coupled by means of groove and key, as at 23, 24, to a heavy lower steel support plate 11b provided with apertures 11c grouped and spaced from each other in a predetermined fashion, so that respectively grouped perforations 11a come to lie over and extend in accordance with the corresponding single apertures 11c of said support plate 11b. However, the total cross-section of the perforations 11a is kept somewhat smaller than that of the respective aperture 11c.

It is, of course, possible to interchange perforated cutter plate 11 with another plate having differently grouped perforations of various diameters relative to each other and to the apertures provided in the support plate 11b (see Figs. 8 and 9). Fig. 8 indicates a perforated cutter plate 24 with a number of relatively large perforations 24a and a support plate 25 with aperture 25a, whereas in Fig. 9 there is depicted a perforated cutter plate 26 with a relatively large perforation 26a resting on support plate 25.

Reverting further to Fig. 6 it will be noted that spacings 11d located between the respective groups of perforations 11a approximately coincide with respective spacings 11e of apertured support plate 11b.

The advantages derived from the aforesaid construction reside primarily in the fact that the sharp-edged perforations of the relatively thin (about 1 mm.), but strongly supported cutter plate which may be made of stainless steel bring about great economy (single operation) and precision (no grinding being required) in the production and immeasurable flexibility (through interchangeability of the perforated plates) in regards to the meat grinding or comminuting apparatus.

A further novel feature hereinabove mentioned is that the meat comminuting apparatus may be used in the fabrication of sausages by applying the ejector or scraper blade construction as shown in Fig. 1 so that the ground meat will be thoroughly mixed, whereas for production of "hamburgers" or "beefsteak tartar" the upper scraper portion 4a may be readily separated from the hub 10 at 4b which is integrally connected to the base ejector 4. Thus ground or minced meat strings passing through the perforated cutter plate with predetermined fineness are unimpededly guided through the apertures of the respective support plate resting on shoulder 1c (Fig. 1), through a free space (upon removal of portion 4a) onto the curved upper surface 4c of scraper blade or blades 4, whence said minced meat strings are deviated toward the outlet 1a without being further subjected to crushing or like action as it would be the case, if the complementary scraper portion 4a were coupled with the scraper blades 4 as hereinabove explained.

Although Fig. 1 shows biasing or spring means 15 accommodated in suitable recess 10b of hub 10, it is well understood that the arrangement of said spring means 15 may be had in a different manner and position, such as below the scraper or ejector means 4, 4a and between wall 18 and a collar (not shown) of shaft 3. The aforesaid spring means 15 may also be in the form of two or more superposed or juxtapositioned spring elements permitting accurate adjustment and positioning of knife cutting edge 6 relative to the selected perforated cutting plate 11 with predetermined number of sharp-edged perforations.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. A cutter head comprising a shaft rotatable about its axis and having opposite ends, a stationary annular plate provided with a plurality of small, sharp-edged perforations extending from one of the surfaces of said plate to the other, said plate being positioned coaxially with said shaft intermediate said ends thereof, a scraper provided with a central hub and carried at said hub thereof by said shaft for rotation with the latter adjacent said one surface of said plate and including a plurality of arms each having an edge fixedly spaced a small predetermined distance from said one surface of said plate, a multi-bladed cutting tool provided with a central hub and carried at said hub thereof by said shaft for rotation therewith adjacent said other surface of said plate and for axial displacement along said shaft, each of said blades being provided with a coarse cutting edge and a fine cutting edge, with the fine cutting edges being disposed closer to said other surface of said plate than the coarse cutting edges, said shaft being threaded at one of said ends thereof, an adjusting nut screwed onto said threaded end of said shaft and engageable with said hub of said cutting tool at that side thereof facing away from said plate and scraper, a lock nut screwed onto said threaded end of said shaft for securing said adjusting nut in position, and spring means interposed between said hub of said scraper and said hub of said cutting tool and bearing against said hub of the latter to bias the same toward and against said adjusting nut so as to maintain said hub of said cutting tool always in engagement with said adjusting nut, to thereby maintain the distance between said fine cutting edges of said blades and said other surface of said plate at the preset adjusted value.

2. A cutter head comprising a shaft rotatable about its axis and having opposite ends, a stationary annular plate provided with a plurality of small perforations extending from one of the surfaces of said plate to the other, said plate being positioned coaxially with said shaft intermediate said ends thereof, scraper means carried by said shaft for rotation with the latter adjacent and fixedly spaced from said one surface of said plate and including a plurality of scraper arms to remove comminuted material from said one surface of said plate, a multi-bladed cutting tool carried by said shaft for rotation therewith adjacent said other surface of said plate, each of said blades being provided with a coarse cutting edge and a fine cutting edge, with the latter being disposed closer to said other surface of said plate than said coarse cutting edge, a threaded extension arranged at one of said ends of said shaft, an adjusting nut screwed onto said threaded end of said shaft and engageable with said cutting tool at that side thereof facing away from said plate and scraper means, a lock nut screwed onto said threaded end of said shaft for retaining said adjusting nut in position, cooperable means on said shaft and said cutting tool permitting axial displacement of the latter along said shaft, and resilient means acting on said cutting tool to bias the same toward and against said adjusting nut, whereby said cutting tool may be adjusted along said shaft by rotation of said adjusting nut while the latter ensures that the distance between said fine cutting edges of said blades and said other surface of said plate remains at the preset adjusted value.

3. In a cutter head according to claim 2; said cutting tool and said scraper means each being provided with a hub by means of which they are carried by said shaft, said resilient means comprising a plurality of pairs of curved plate springs supported by said hub of said scraper means and engaging said hub of said cutting tool.

4. In a cutter head according to claim 3; said hub of said scraper means being provided in its surface facing said cutting tool hub with a plurality of recesses defining seats for said plate spring pairs.

5. An apparatus for comminuting meat and like alimentary product comprising a shaft having a threaded end portion, rotatable knife means having a hub keyed to said shaft, said knife means being provided with an upper serrated cutting edge for precutting said product and with a lower cutting edge for finely cutting said precut product, superposed plate means positioned below said knife means, ejector blade means connected to said shaft and provided with a hub having a circular recess facing said knife means, spring means located in said recess and spacing said knife means from said plate means, and means in threaded engagement with said threaded portion of said shaft and adapted to adjust the position of said knife means relative to said superposed plate means via said spring means, said superposed plate means including a relatively thick support plate provided with apertures and a relatively thin cutting plate provided with perforations arranged to extend between said support plate and said lower cutting edge of said knife means, said ejector blade means communicating with an outlet for ejecting therethrough said comminuted product discharged from said cutting plate and passed through apertures of said support plate said perforations being in registry with said apertures.

6. An apparatus according to claim 5, said ejector blade means including a base blade portion and an upper blade portion connected to said base blade portion at the hub thereof and for removal from the same, to thereby enlarge the free passage from said apertures of said support plate onto said ejector blade means and to reduce crushing and scraping action on said comminuted product.

7. An apparatus for comminuting meat and like alimentary product comprising a housing having a wall with a shoulder, a shaft extending into said housing and having a threaded end portion, rotatable knife means having a hub keyed to said shaft, said knife means being provided with an upper coarse serrated cutting edge for precutting said product and with a lower fine cutting edge for finely cutting said precut product, superposed plate means positioned directly below said lower cutting edge of said knife means, ejector blade means connected to said shaft and provided with a hub, spring means surrounding said shaft for spacing said knife means from said plate means, means in threaded engagement with said threaded portion of said shaft and adapted to adjust via said spring means the position of said knife means, said superposed plate means including a relatively thick support plate provided with apertures and a relatively thin cutting plate provided with perforations arranged to extend between said support plate and said lower cutting edge of said knife means, said perforations being substantially in registry with said apertures, and means coupling said cutting plate in contact with said support plate, said support plate being carried by said shoulder of said housing wall, said ejector blade means being adapted to rotate past an outlet in communication with the interior of said housing and for ejecting therethrough said comminuted product, when discharged from said cutting plate and passed through apertures of said support plate onto said ejector blade means.

8. An apparatus according to claim 7, said ejector blade means forming a base blade portion connected to said hub thereof and spaced from said support plate to thereby ensure free passage from said apertures of said support plate onto said base blade portion.

References Cited in the file of this patent

UNITED STATES PATENTS

| | | |
|---|---|---|
| 770,038 | Bach | Sept. 13, 1904 |
| 1,629,377 | Buckwalter | May 17, 1927 |
| 2,771,636 | McIntosh et al. | Nov. 27, 1956 |
| 2,840,318 | Schnell | June 24, 1958 |

FOREIGN PATENTS

| | | |
|---|---|---|
| 315,809 | Switzerland | Oct. 31, 1956 |